US011528306B1

(12) United States Patent
Subbaiyan et al.

(10) Patent No.: US 11,528,306 B1
(45) Date of Patent: Dec. 13, 2022

(54) CAPTURING MISSING MEDIA FRAMES DURING A VIRTUAL COLLABORATION

(71) Applicant: International Business Machines Corporation, Armonk, NY (US)

(72) Inventors: Sivaraj Subbaiyan, Bangalore (IN); Ramprasad Bhat, Bangalore (IN); Ponnala Praveen Kumar, Bengaluru (IN); Prabhat Shankar, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/390,117

(22) Filed: Jul. 30, 2021

(51) Int. Cl.
*H04L 65/403* (2022.01)
*G06Q 10/10* (2012.01)

(52) U.S. Cl.
CPC ....... *H04L 65/403* (2013.01); *G06Q 10/1053* (2013.01)

(58) Field of Classification Search
CPC .............. H04L 65/403; H04L 12/1813; G06Q 10/1053
USPC .......................................................... 709/204
See application file for complete search history.

(56) References Cited

U.S. PATENT DOCUMENTS

| 2006/0146124 | A1* | 7/2006 | Pepperell | ........... | H04N 21/4334 348/14.08 |
| 2007/0188901 | A1 | 8/2007 | Heckerman | | |
| 2008/0086743 | A1* | 4/2008 | Cheng | ........... | H04N 21/23106 725/38 |
| 2011/0069138 | A1* | 3/2011 | Ali | ........... | H04N 19/154 348/E17.001 |
| 2013/0339431 | A1 | 12/2013 | Yannakopoulos | | |
| 2015/0281306 | A1* | 10/2015 | Barak | ........... | H04N 21/6582 725/93 |

OTHER PUBLICATIONS

Anonymous. "Method and System for Dynamic Catch-up of Events in a Collaborative Online Environment." Published Sep. 22, 2013. 4 pages. Published by IP.com. https://priorart.ip.com/IPCOM/000231032.
Anonymous. "Online meeting assistance." Published Jan. 5, 2018. 5 pages. Published by IP.com. https://priorart.ip.com/IPCOM/000252378.
Mell, et al., "The NIST Definition of Cloud Computing," Recommendations of the National Institute of Standards and Technology, U.S. Department of Commerce, Special Publication 800-145, Sep. 2011, 7 pgs.
Shi, et al., "Improving Meeting Collaboration And Meeting Experience Between Presenter And Inattentive Participants." Published Sep. 3, 2014. 11 pages. Published by IP.com. https://priorart.ip.com/IPCOM/000238538.

* cited by examiner

*Primary Examiner* — Zi Ye
(74) *Attorney, Agent, or Firm* — Jared L. Montanaro

(57) ABSTRACT

A processor may establish a virtual collaboration between two or more users. The processor may determine whether there is an interference with the virtual collaboration. The processor may maintain the virtual collaboration. The processor may generate an interference report associated with the interference. The processor may provide the interference report to at least one of the two or more users.

18 Claims, 6 Drawing Sheets

CAPTURING MISSING MEDIA FRAMES DURING A VIRTUAL COLLABORATION

BACKGROUND

The present disclosure relates generally to the field of virtual collaboration, and more specifically to capturing missing media frames during a virtual collaboration.

With the increased number of meetings in the virtual work environment, professionals are more dependent on uninterrupted media streaming. Any pause or interruption in the media content delivery is likely to result in an incomplete and possibly incorrect perception of the information being conveyed.

SUMMARY

Embodiments of the present disclosure include a method, computer program product, and system for capturing missing media frames. A processor may establish a virtual collaboration between two or more users. The processor may determine whether there is an interference with the virtual collaboration. The processor may maintain the virtual collaboration. The processor may generate an interference report associated with the interference. The processor may provide the interference report to at least one of the two or more users.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of certain embodiments and do not limit the disclosure.

Figure 1A:
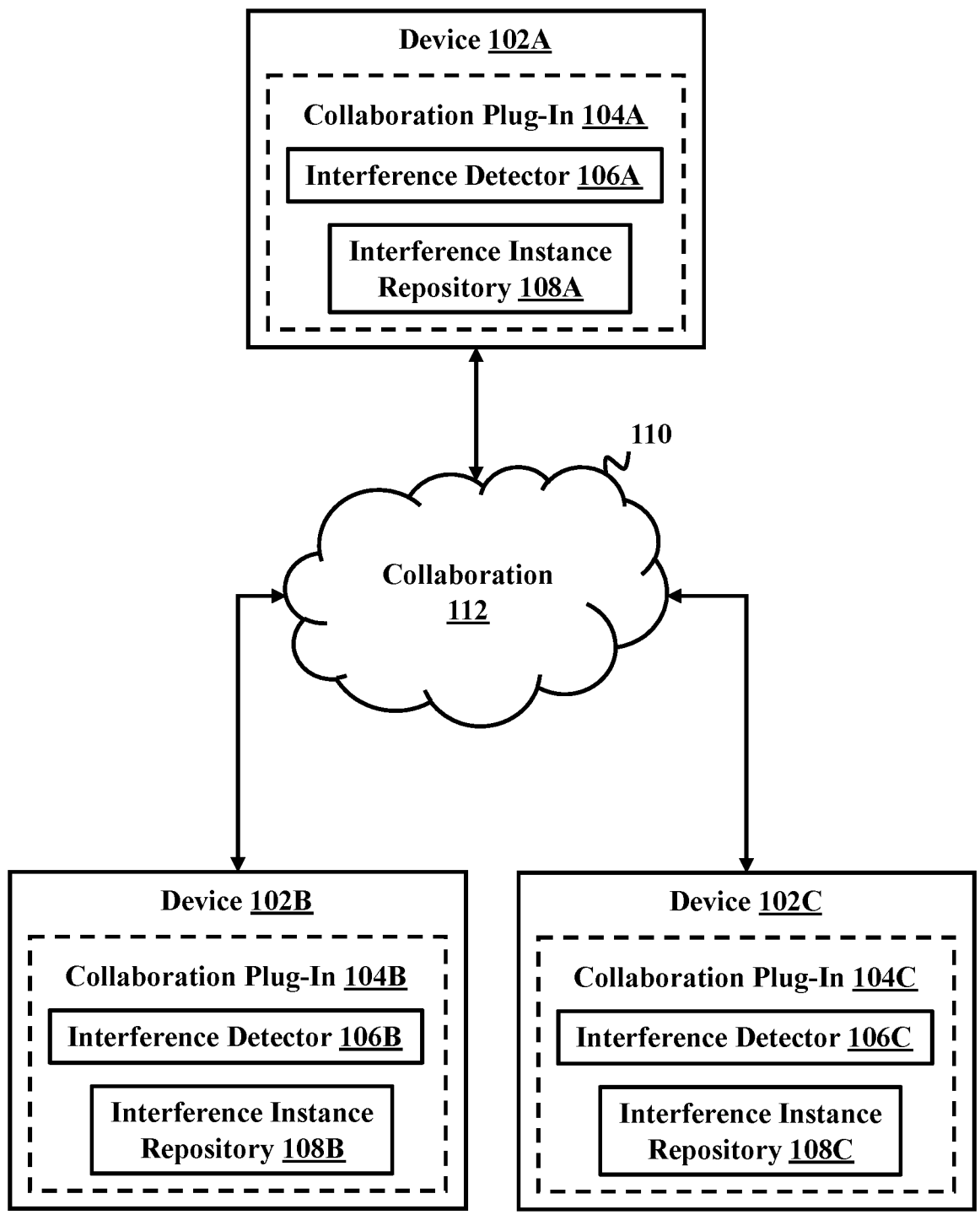
FIG. 1A illustrates an example of a virtual collaboration system, in accordance with aspects of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of virtual collaboration, and more specifically to capturing missing media frames during a virtual collaboration. While the present disclosure is not necessarily limited to such applications, various aspects of the disclosure may be appreciated through a discussion of various examples using this context.

With the increased number of meetings in the virtual work environment, professionals are more dependent on uninterrupted media (e.g., video, audio, etc.) streaming than ever. Any pause or (brief) interruption in the media content delivery is likely to result in an incomplete and possibly incorrect perception of the information being conveyed.

The stake of such a seemingly brief interruption could be high, especially, where physical expression, tone, and wordings of the communication matter. In some (trivial/routine) instances (collaborations/meetings), the relevance of such information may not be significant, however, in certain scenarios that involve complex matters, every moment lost cannot be re-constructed even if it is repeated (e.g., an interviewee facing an interview panel for hiring, conferences, consultations, examinations, etc.). It is not ideal to miss out on even a few seconds in such interactions and such moments cannot be re-constructed/repeated, at least to the extent they were first relayed (e.g., with a specific inflection, movement, etc.) after the first response is lost.

Accordingly, disclosed herein is a method, system, and computer program product for identifying missing media/video frames/content due to an interference/interruption (e.g., poor network connection on a receiver's end, low bandwidth issues by a user, etc.). Discussed more thoroughly throughout this disclosure is a solution that notifies a user (e.g., the receiver/host) about the details of the missing frames and redelivers the same frames with appropriate context.

Before turning to the FIGS. it is noted that there are a number of virtual collaboration tools used to connect people in today's rapidly changing work environment, with many of them leveraging upon the ability to create a virtual face-to-face interaction through live streaming of the video captured on both sides. However, unobstructed (e.g., non-interference/interruption) connectivity of internet plays a pivotal role in effectively fulfilling this objective. It is not uncommon to face problems due to the poor internet connection wherein there will be delays in streaming and sometimes the entire content being missed for a brief duration.

The gravity of this problem is very high in expression sensitive interactions (conferences, consultations, etc.). Accordingly, the proposed solution discussed herein makes use of a technique to store content of a video being streamed on a sender's (e.g., first user's) side and looks for the missing timeframes/segments from a receiver's (e.g., second/subsequent user's) end and redelivers only those pieces. In some embodiments, the solution(s) discussed herein are opt-in, where media (e.g., audio, video, etc.) streams are only recorded and/or delivered upon express consent of the users.

In some embodiments, the redelivered timeframes/frames/missed media content could be sent during the media stream and each user may be given a selected lag/buffer (e.g., 5 seconds, 10 seconds, etc.) during the stream such that if any content is missed, a user can view/hear the content in near-realtime. In some embodiments, discussed below in regard to the FIGS., the missed out media frames/content is rendered by appending a few seconds before and after the connectivity is lost to ensure that the viewer understands the appropriate context.

Referring now to FIG. 1A, illustrated an example of a virtual collaboration system 100, in accordance with aspects of the present disclosure. As depicted, the virtual collaboration system 100 includes devices 102A-C and a network 110 (e.g., internet, etc.). In some embodiments, each of the devices 102A-C includes a collaboration plug-in 1-4A-C, which further includes an interference detector 106A-C and an interference instance repository 108A-C. In some embodiments, the devices 102A-C are connected in a collaboration 112 (e.g., video stream, VoIP call, etc.) via the network 110. Before turning to an example using FIG. 1A, it is noted that any of the devices 102A-C can be utilized by/can be a host of the collaboration 112 or be a participant/utilized by a participant of the collaboration 112. Further noted, is that although only three device: 102A-C are depicted, any number of devices could be connected to the collaboration 112.

Accordingly, in some embodiments, the software that connects the two or more devices 102A-C will each have the collaboration plug-in 104A-C that continuously checks network 110 connectivity (e.g., is streaming quality above a media threshold, bandwidth high enough for media streaming, etc.). In some embodiments, when any of collaboration plug-ins 104A-C, via any of the interference detectors 106A-C identifies that there is an interference/interruption, the collaboration plug-ins 104A-C immediately capture the start and end time of the duration for which the interference was identified (e.g., the network 110 was disconnected). This timeframe for the interference could be in seconds to minutes.

In some embodiments, only the device 102A-C with the interference detects the interference and then communicates with the other devices 102A-C that do not have the interference, which then capture the content in the timeframe for the interference for the device with the interference. In another embodiment, the other devices 102A-C not experiencing an interference may identify/detect an interference of one of the other devices 102A-C by identifying/detecting that the device with the interference is no longer connected to the collaboration 112 and the devices 102A-C that do not have the interference may begin capturing the interfered with content.

In some embodiments, when there is an interference (e.g., internet connectivity is down), the content being (re)delivered is still being captured locally and stored in the device 102A-C where the software is installed (e.g., the host device or a device 102A-C not experiencing an interference may locally store the content to be sent to the interfered with device 102A-C).

In some embodiments, for every individual/device 102A-C taking part in the virtual meeting, the time duration of the interference (e.g., internet disconnection/interruption), if any, is noted (with a timestamp), and the media (e.g., audio, video, etc.) content during this period is also captured locally in their respective devices, which allows for multiple back-ups for the interfered content.

In some embodiments, when the (virtual) collaboration 112 (e.g., meeting, conference, etc.) is ended, the details of the duration that had an interference (e.g., connectivity problem) along with the content captured in that duration is sent to a centralized server (not depicted) from each node/individual device 102A-C that participated in the meeting.

In some embodiments, a participant associated with any of the devices 102A-C can choose to look for the details of information they missed or any of the devices 102A-C can automatically look for and/or retrieve the information/content/frames that was/were missed. In embodiments, from the participant's point of view, the information that could have been missed could be: information that was lost due to connectivity problem from their end (e.g., device 102B lost internet, etc.); and/or information that was lost due to connectivity problem from another user's end (e.g., device 102A notes that device 102B lost internet, streaming quality, etc.).

In some embodiments, a host (e.g., owner/user of device 102A, etc.) can configure the collaboration 112 in such a way that they can access all the missing video content from all the participants (e.g., 102B-C) due to poor connectivity from their (e.g., device 102A's) side. In some embodiments, each participant may also get to receive the missing content only from the host (depending on the settings).

In some embodiments, in order to provide an appropriate context, the missed content/video frame is sewed with a few seconds (e.g., 5 seconds, 10 seconds, as much times as needed for context, or as much time as set by the host, etc.) of the mainline video before and after the interference (e.g., connectivity loss). In such an embodiment, this will ensure that a viewer/participant/user understands where exactly the interference/connectivity was lost and what was missed out (e.g., which content was missed). This duration before and after the missed-out video frame/content can be made configurable depending on how much of the context is necessary (e.g., natural language processing could be utilized to determine that a specific topic was being discussed during an interference the disclosed solution could provide 10 seconds before and after the interference to give context to the specific topic).

Figure 1B:
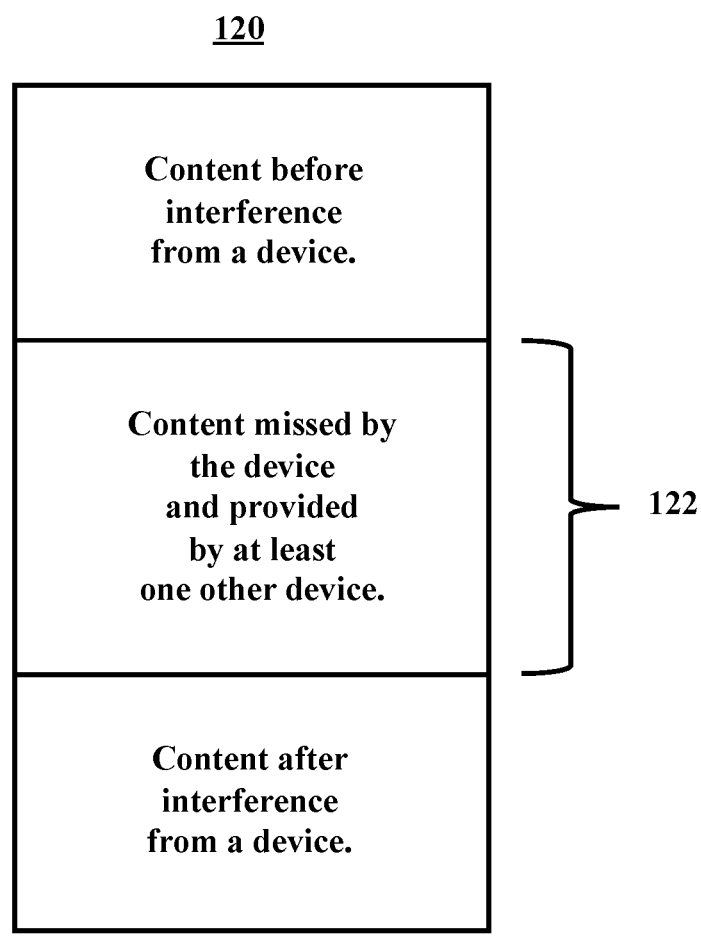
FIG. 1B illustrates an example of an instance of a virtual collaboration, in accordance with aspects of the present disclosure.

Referring now to FIG. 1B, illustrated is an example of an instance 120 of a virtual collaboration, in accordance with aspects of the present disclosure. As depicted, the instance 120 includes content before and after an interference 122, and the interference 122 has content missed by a device (e.g., 102A-C) recorded/captured and provided by at least one other device that did not have an interference.

As depicted, the instance 120/video frame would be rendered with an appended portion from the mainline media/video before and after the interference/connectivity loss. Here, the "mainline media/video" refers to the media/video content that was continuing while a device/participant was disconnected from the collaboration (e.g., 112).

As an example, in regard to FIGS. 1A and 1B, let's consider a scenario with 3 participants and a host for a meeting that was held between 19:00:00 to 19:30:00.

The details conveyed as an interference report could be as follows:

| Host's view: | | |
| --- | --- | --- |
| Participant 1 | 19:21:35-19:22:48 | Link to the video |
| Participant 1 | 19:24:12-19:26:02 | Link to the video |
| Participant 2 | 19:15:34-19:16:07 | Link to the video |
| Participant 3 | 19:05:07-19:07:56 | Link to the video |

| Participant's view: | | |
| --- | --- | --- |
| Host | 19:18:37-19:18:41 | Link to the video |

Where any of the links to the video is may be the instance 120 and which can be stored in any of the interference instance repositories 108A-C or a centralized repository.

In some embodiments, if the host has allowed the participant to view missing video frames of other participants as well, it would look as follows:

| Host | 19:18:37-19:18:41 | Link to the video |
| Participant 1 | 19:21:35-19:22:48 | Link to the video |
| Participant 1 | 19:24:12-19:26:02 | Link to the video |
| Participant 2 | 19:15:34-19:16:07 | Link to the video |
| Participant 3 | 19:05:07-19:07:56 | Link to the video |

In some embodiments, the proposed solution can be made available as an optional feature which can be turned ON as per the need and sensitivity of the interaction (e.g., private setting for personal conversations, etc.). In some embodiments, the plug-in (e.g., collaboration plug-ins 104A-C) may automatically change input configurations after identifying a type of interaction (e.g., a conference may have instances listed to all participants, whereas an interview could only be sent to select hiring managers, etc.).

Figure 2:
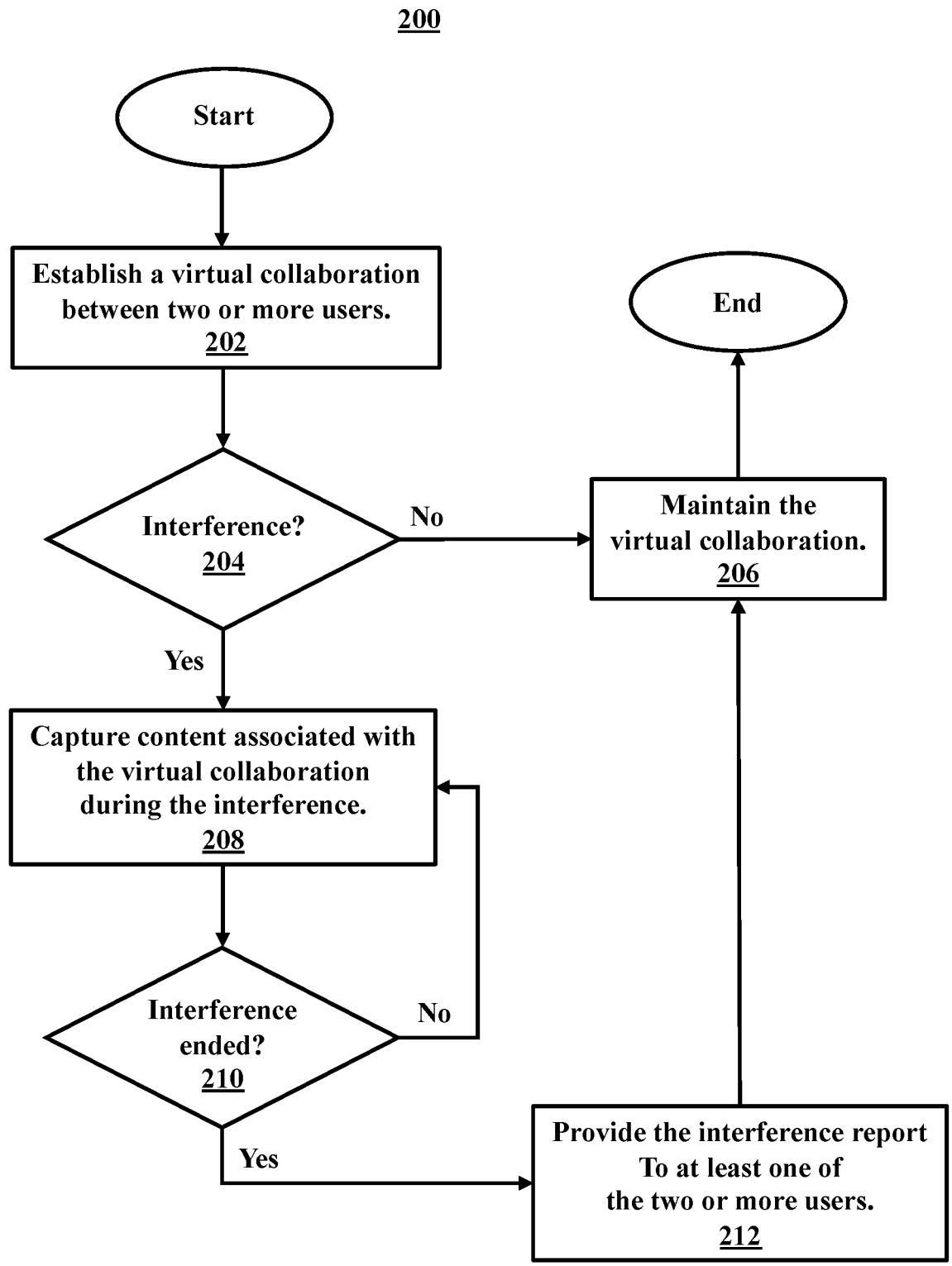
FIG. 2 illustrates a flowchart of an example method for capturing missing media frames, in accordance with aspects of the present disclosure.

Referring now to FIG. 2, illustrated is a flowchart of an example method 200 for capturing missing media frames, in accordance with aspects of the present disclosure. In some embodiments, the method 200 may be performed by a processor (e.g., of the virtual collaboration system 100 of FIG. 1A, etc.). It is noted that although the method 200 is depicted in a particular flow, the operations discussed could be performed in any arrangement and/or include or exclude some operations.

Accordingly, in some embodiments, the method 200 begins at operation 202, where the processor establishes a virtual collaboration (e.g., video stream, etc.) between two or more users (e.g., devices of users, etc.). In some embodiments, the method 200 proceeds to decision block 204, where the processor determines whether there is an interference (e.g., degradation of video quality, audio quality, bandwidth, internet connectivity loss, etc.) with the virtual collaboration.

If, at decision block 204, it is determined/identified that there is no interference, the method 200 proceeds to operation 206, where the processor maintains the virtual collaboration. In some embodiments, if, at decision block 204, it is determined/identified that there is an interference, the method 200 proceeds to operation 208, where the processor captures content associated with the virtual collaboration during the interference.

In some embodiments, capturing the content includes recording a first instance of the virtual collaboration, where the first instance of the virtual collaboration is a range before and after the interference (e.g., as discussed and depicted in regard to FIG. 1B). In some embodiments, the method proceeds to decision block 210, where it is determined by the processor is the interference has ended.

If, at decision block 210, it is determined/identified that the interference has not ended, the method 200 proceeds back to operation 208, effectively creating a loop until it is identified that the interference has ended. This is favorable to help identify a length/time/duration of/for the interference, e.g., the content/instance/one or more segments is/are captured for as long as the interference is identified to have not ended.

In some embodiments, if, at decision block 210, it is determined/identified that the interference has ended, the method 200 proceeds to operation 212. At operation 212, the processor provides an interference report to at least one of the two or more users (e.g., as discussed in the example conveyed in regard to FIG. 1B). In some embodiments, in order to provide the interference report, the processor may first generate the interference report, which is associated with the interference.

In some embodiments, after operation 212, the method 200 proceeds to operation 206. In some embodiments, after operation 206, the method 200 may end.

In some embodiments, discussed below, there are one or more operations of the method 200 not depicted for the sake of brevity and which are discussed throughout this disclosure. Accordingly, in some embodiments, the processor may continuously analyze the virtual collaboration and record one or more instances of the virtual collaboration. In some embodiments, the recording of the one or more instances may only be in a temporary storage state and only permanently recorded if an interference is determined (e.g., the recordings, depending on user preferences, can be automatically deleted if no interference is detected).

Further, in some embodiments, generating the interference report, which could be a table such as that detailed in an example in FIG. 1B, may include the processor identifying one or more time segments associated with the interference (e.g., a duration of the interference such as that determined from the operation 208 and decision block 210 loop discussed above). In some embodiments, the one or more time segments could make-up part of the instances of the virtual collaboration (e.g., the one or more time segments are the interference and the total instance is the segments in addition to the recordings before and after the interference).

In some embodiments, to further generate the interference report, the processor may collect the one or more time segments from at least one of the two or more users. For example, if the host was able to have no interference with the virtual collaboration at all, and one participant lost internet, the host could provide the missing segments to the participant. As another example, the host could have had an interference at the same time as a participant and another participant could provide the missing segments to the host and the participant. In yet another example, one participant may have missed content for a 30 second duration and the host may have had an interference in the first 15 seconds of that duration but not the last 15 seconds. Further, a second participant may have had an interference in the last 15 seconds and not the first 15 seconds, thus the host and the second user may have their segments combined and then relayed to the one participant.

In some embodiments, generating the interference report further includes the processor generating a hyperlink of the one or more time segments so that a user experiencing and interference can watch the content that was missed during the interference.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of portion independence in that the consumer generally has no control or knowledge over the exact portion of the provided resources but may be able to specify portion at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 3A:
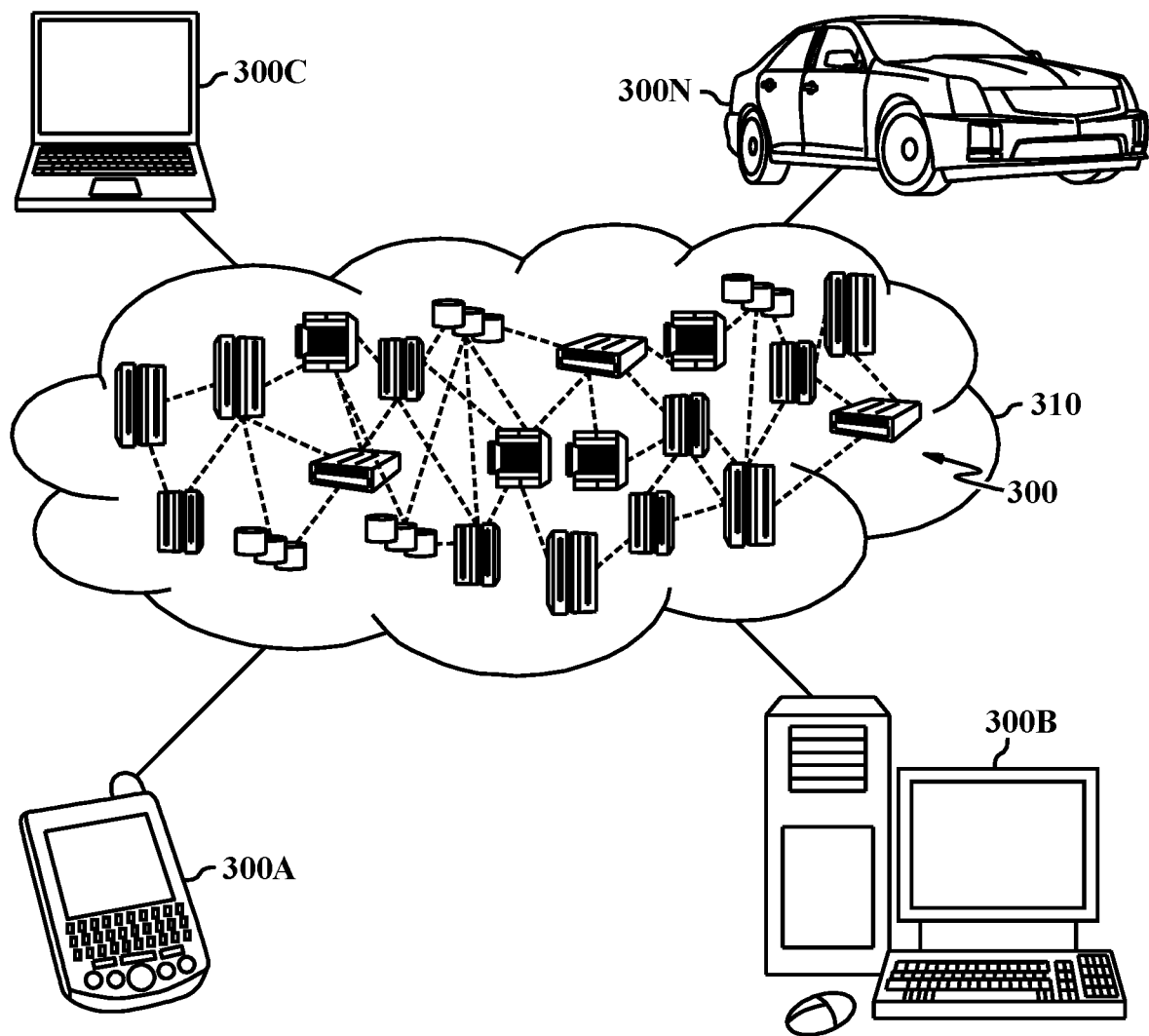
FIG. 3A illustrates a cloud computing environment, in accordance with aspects of the present disclosure.

FIG. 3A, illustrated is a cloud computing environment 310 is depicted. As shown, cloud computing environment 310 includes one or more cloud computing nodes 300 with which local computing devices used by cloud consumers, such as, for example, personal digital assistant (PDA) or cellular telephone 300A, desktop computer 300B, laptop computer 300C, and/or automobile computer system 300N may communicate. Nodes 300 may communicate with one another. They may be grouped (not shown) physically or virtually, in one or more networks, such as Private, Community, Public, or Hybrid clouds as described hereinabove, or a combination thereof.

This allows cloud computing environment 310 to offer infrastructure, platforms and/or software as services for which a cloud consumer does not need to maintain resources on a local computing device. It is understood that the types of computing devices 300A-N shown in FIG. 3A are intended to be illustrative only and that computing nodes 300 and cloud computing environment 310 can communicate with any type of computerized device over any type of network and/or network addressable connection (e.g., using a web browser).

Figure 3B:
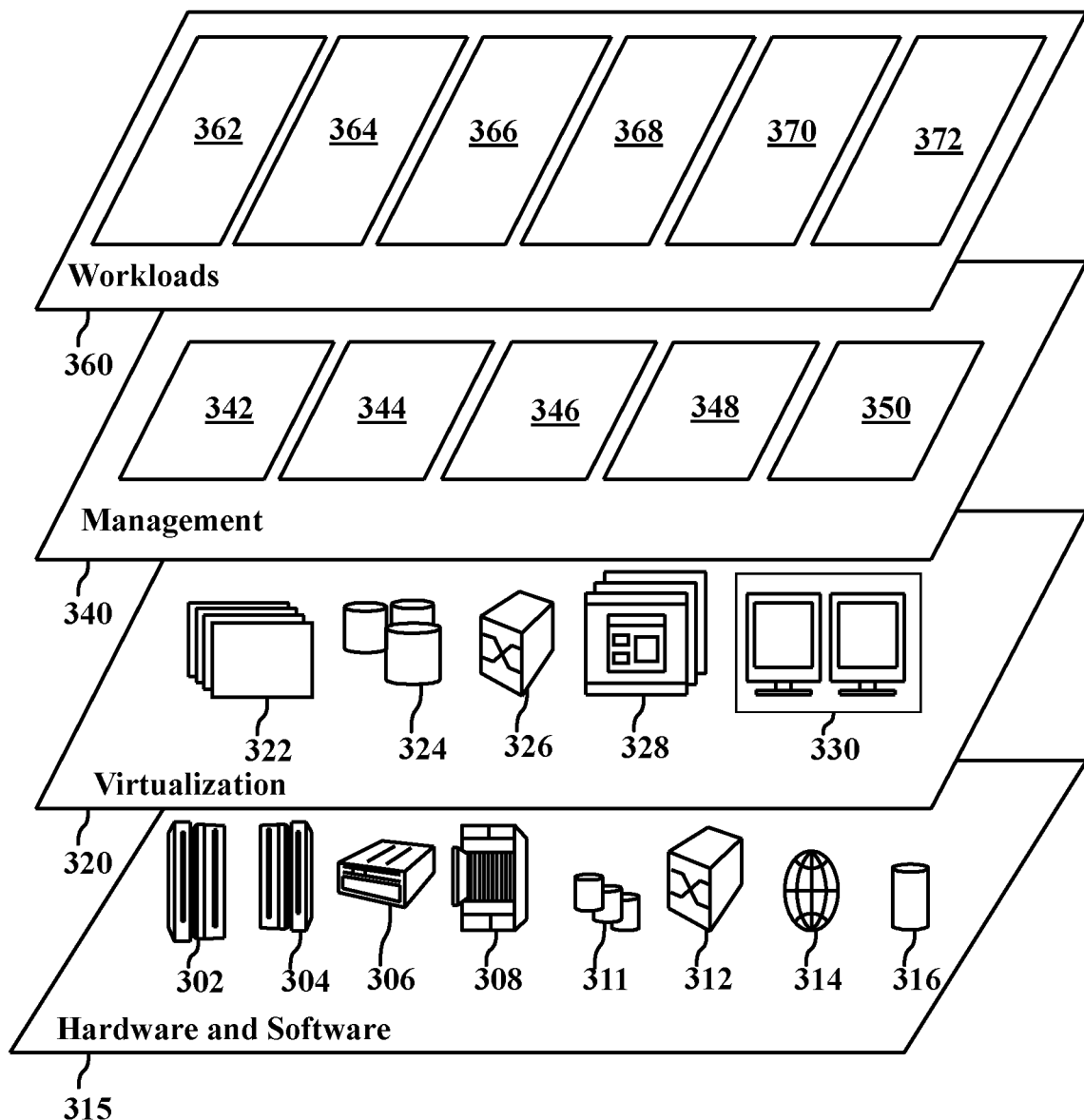
FIG. 3B illustrates abstraction model layers, in accordance with aspects of the present disclosure.

FIG. 3B, illustrated is a set of functional abstraction layers provided by cloud computing environment 310 (FIG. 3A) is shown. It should be understood in advance that the components, layers, and functions shown in FIG. 3B are intended to be illustrative only and embodiments of the disclosure are not limited thereto. As depicted below, the following layers and corresponding functions are provided.

Hardware and software layer 315 includes hardware and software components. Examples of hardware components include: mainframes 302; RISC (Reduced Instruction Set Computer) architecture based servers 304; servers 306; blade servers 308; storage devices 311; and networks and networking components 312. In some embodiments, software components include network application server software 314 and database software 316.

Virtualization layer 320 provides an abstraction layer from which the following examples of virtual entities may be provided: virtual servers 322; virtual storage 324; virtual networks 326, including virtual private networks; virtual applications and operating systems 328; and virtual clients 330.

In one example, management layer 340 may provide the functions described below. Resource provisioning 342 provides dynamic procurement of computing resources and other resources that are utilized to perform tasks within the cloud computing environment. Metering and Pricing 344 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 346 provides access to the cloud computing environment for consumers and system administrators. Service level management 348 provides cloud computing resource allocation and management such that required service levels are met. Service Level Agreement (SLA) planning and fulfillment 350 provide pre-arrangement for, and procurement of, cloud computing resources for which a future requirement is anticipated in accordance with an SLA.

Workloads layer 360 provides examples of functionality for which the cloud computing environment may be utilized. Examples of workloads and functions which may be provided from this layer include: mapping and navigation 362; software development and lifecycle management 364; virtual classroom education delivery 366; data analytics processing 368; transaction processing 370; and capturing missing media frames 372.

Figure 4:
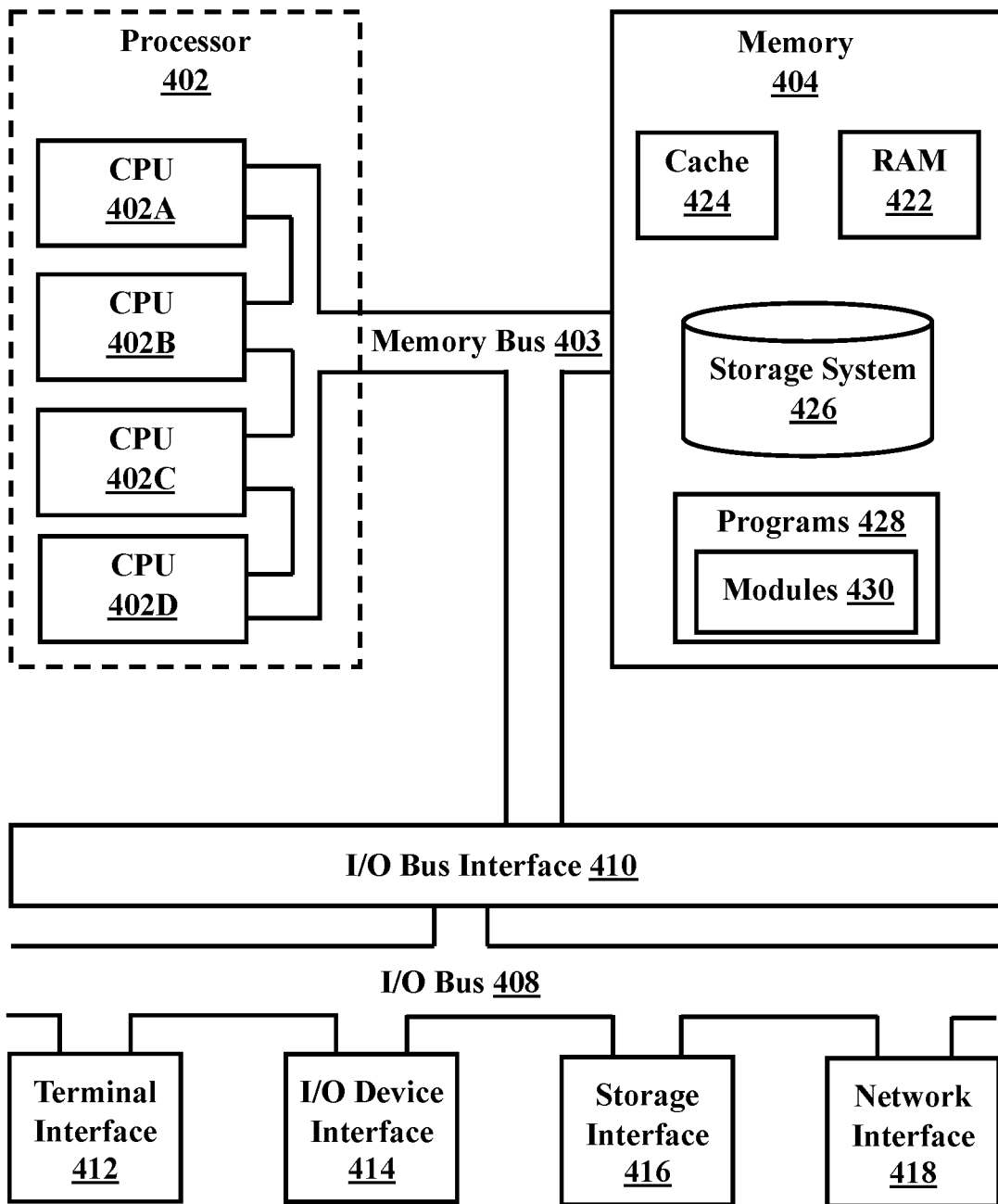
FIG. 4 illustrates a high-level block diagram of an example computer system that may be used in implementing one or more of the methods, tools, and modules, and any related functions, described herein, in accordance with aspects of the present disclosure.

FIG. 4, illustrated is a high-level block diagram of an example computer system 401 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 401 may comprise one or more CPUs 402, a memory subsystem 404, a terminal interface 412, a storage interface 416, an I/O (Input/Output) device interface 414, and a network interface 418, all of which may be communicatively coupled, directly or indirectly, for inter-component communication via a memory bus 403, an I/O bus 408, and an I/O bus interface unit 410.

The computer system 401 may contain one or more general-purpose programmable central processing units (CPUs) 402A, 402B, 402C, and 402D, herein generically referred to as the CPU 402. In some embodiments, the computer system 401 may contain multiple processors typical of a relatively large system; however, in other embodiments the computer system 401 may alternatively be a single CPU system. Each CPU 402 may execute instructions stored in the memory subsystem 404 and may include one or more levels of on-board cache.

System memory 404 may include computer system readable media in the form of volatile memory, such as random access memory (RAM) 422 or cache memory 424. Computer system 401 may further include other removable/non-removable, volatile/non-volatile computer system storage media. By way of example only, storage system 426 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 404 can include flash memory, e.g., a flash memory stick drive or a flash drive. Memory devices can be connected to memory bus 403 by one or more data media interfaces. The memory 404 may include at least one program product having a set (e.g., at least one) of program modules that are configured to carry out the functions of various embodiments.

One or more programs/utilities 428, each having at least one set of program modules 430 may be stored in memory 404. The programs/utilities 428 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 428 and/or program modules 430 generally perform the functions or methodologies of various embodiments.

Although the memory bus 403 is shown in FIG. 4 as a single bus structure providing a direct communication path among the CPUs 402, the memory subsystem 404, and the I/O bus interface 410, the memory bus 403 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 410 and the I/O bus 408 are shown as single respective units, the computer system 401 may, in some embodiments, contain multiple I/O bus interface units 410, multiple I/O buses 408, or both. Further, while multiple I/O interface units are shown, which separate the I/O bus 408 from various communications paths running to the various I/O devices, in other embodiments some or all of the I/O devices may be connected directly to one or more system I/O buses.

In some embodiments, the computer system 401 may be a multi-user mainframe computer system, a single-user system, or a server computer or similar device that has little or no direct user interface, but receives requests from other computer systems (clients). Further, in some embodiments, the computer system 401 may be implemented as a desktop computer, portable computer, laptop or notebook computer, tablet computer, pocket computer, telephone, smartphone, network switches or routers, or any other appropriate type of electronic device.

It is noted that FIG. 4 is intended to depict the representative major components of an exemplary computer system 401. In some embodiments, however, individual components may have greater or lesser complexity than as represented in FIG. 4, components other than or in addition to those shown in FIG. 4 may be present, and the number, type, and configuration of such components may vary.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A system for capturing missing media frames, the system comprising:
a memory; and
a processor in communication with the memory, the processor being configured to perform operations comprising:
establishing a virtual collaboration between two or more users;
determining whether there is an interference with the virtual collaboration;
maintaining the virtual collaboration;
generating an interference report associated with the interference, wherein generating the interference report associated with the interference includes:
identifying one or more time segments associated with the interference,
collecting the one or more time segments from at least one of the two or more users, and
generating a hyperlink of the one or more time segments; and
providing the interference report to at least one of the two or more users.

2. The system of claim 1, wherein the processor is further configured to perform operations comprising:
analyzing, continuously, the virtual collaboration; and
recording one or more instances of the virtual collaboration.

3. The system of claim 2, wherein determining whether there is the interference with the virtual collaboration includes:
identifying that there is there is no interference.

4. The system of claim 2, wherein determining whether there is the interference with the virtual collaboration includes:
identifying that there is there is the interference.

5. The system of claim 4, wherein the processor is further configured to perform operations comprising:
capturing content associated with the virtual collaboration during the interference, wherein capturing the content includes recording a first instance of the virtual collaboration, and wherein the first instance of the virtual collaboration is a range before and after the interference.

6. The system of claim 5, wherein the processor is further configured to perform operations comprising:
identifying that the interference has ended.

7. A method for capturing missing media frames, the method comprising:
establishing, by a processor, a virtual collaboration between two or more users;
determining whether there is an interference with the virtual collaboration;
maintaining the virtual collaboration;
generating an interference report associated with the interference, wherein generating the interference report associated with the interference includes:
identifying one or more time segments associated with the interference,
collecting the one or more time segments from at least one of the two or more users, and
generating a hyperlink of the one or more time segments; and
providing the interference report to at least one of the two or more users.

8. The method of claim 7, further comprising:
analyzing, continuously, the virtual collaboration; and
recording one or more instances of the virtual collaboration.

9. The method of claim 8, wherein determining whether there is the interference with the virtual collaboration includes:
identifying that there is there is no interference.

10. The method of claim 8, wherein determining whether there is the interference with the virtual collaboration includes:
identifying that there is there is the interference.

11. The method of claim 10, further comprising:
capturing content associated with the virtual collaboration during the interference, wherein capturing the content includes recording a first instance of the virtual collaboration, and wherein the first instance of the virtual collaboration is a range before and after the interference.

12. The method of claim 11, further comprising:
identifying that the interference has ended.

13. A computer program product for capturing missing media frames comprising a computer readable storage medium having program instructions embodied therewith, the program instructions executable by a processor to cause the processor to perform operations, the operations comprising:
establishing a virtual collaboration between two or more users;
determining whether there is an interference with the virtual collaboration;
maintaining the virtual collaboration;
generating an interference report associated with the interference, wherein generating the interference report associated with the interference includes:
identifying one or more time segments associated with the interference,
collecting the one or more time segments from at least one of the two or more users, and
generating a hyperlink of the one or more time segments; and
providing the interference report to at least one of the two or more users.

14. The computer program product of claim 13, wherein the processor is further configured to perform operations comprising:
analyzing, continuously, the virtual collaboration; and
recording one or more instances of the virtual collaboration.

15. The computer program product of claim 14, wherein determining whether there is the interference with the virtual collaboration includes:
identifying that there is there is no interference.

16. The computer program product of claim 14, wherein determining whether there is the interference with the virtual collaboration includes:
identifying that there is there is the interference.

17. The computer program product of claim 16, wherein the processor is further configured to perform operations comprising:
capturing content associated with the virtual collaboration during the interference, wherein capturing the content includes recording a first instance of the virtual collaboration, and wherein the first instance of the virtual collaboration is a range before and after the interference.

18. The computer program product of claim 17, wherein the processor is further configured to perform operations comprising:
identifying that the interference has ended.

* * * * *